US012792410B2

(12) United States Patent
Kim et al.

(10) Patent No.: US 12,792,410 B2
(45) Date of Patent: Nov. 10, 2026

(54) DEVICE AND METHOD FOR PERFORMING LDPC ENCODING AND DECODING FOR GENERAL PURPOSE PROCESSOR

(71) Applicant: ELECTRONICS AND TELECOMMUNICATIONS RESEARCH INSTITUTE, Daejeon (KR)

(72) Inventors: Nam Il Kim, Daejeon (KR); Seok Ki Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 397 days.

(21) Appl. No.: 18/389,966

(22) Filed: Dec. 20, 2023

(65) Prior Publication Data

US 2024/0211314 A1 Jun. 27, 2024

(30) Foreign Application Priority Data

Dec. 27, 2022 (KR) ........................ 10-2022-0185988
May 25, 2023 (KR) ........................ 10-2023-0067412

(51) Int. Cl.
*G06F 9/46* (2006.01)
*G06F 9/50* (2006.01)

(52) U.S. Cl.
CPC .......... *G06F 9/5038* (2013.01); *G06F 9/5044* (2013.01)

(58) Field of Classification Search
CPC ............................ G06F 9/5038; G06F 9/5044
See application file for complete search history.

(56) References Cited

U.S. PATENT DOCUMENTS

| | | | |
|---|---|---|---|
| 8,209,592 B2 | 6/2012 | Pisek et al. | |
| 8,615,023 B2 | 12/2013 | Oh et al. | |
| 8,654,880 B2 | 2/2014 | Zhou et al. | |
| 2014/0310418 A1* | 10/2014 | Sorenson, III | H04L 67/1023 709/226 |
| 2018/0336067 A1 | 11/2018 | Lee et al. | |
| 2018/0337691 A1* | 11/2018 | Kalachev | H03M 13/616 |
| 2022/0038114 A1 | 2/2022 | Kim | |

FOREIGN PATENT DOCUMENTS

| | | |
|---|---|---|
| KR | 10-2018-0126401 A | 11/2018 |
| KR | 10-2022-0033981 A | 3/2022 |

OTHER PUBLICATIONS

Qiangyi Zhao, et al., "Design of a Multi-Core Scheduling Scheme for Tera-bit/s LDPC Decoding", The 28th Wireless and Optical Communication Conference (WOCC 2019), (Aug. 22, 2019).

* cited by examiner

*Primary Examiner* — Gregory A Kessler
(74) *Attorney, Agent, or Firm* — LRK PATENT LAW FIRM

(57) ABSTRACT

A method for Low Density Parity Check (LDPC) encoding and decoding for a general-purpose processor in methods for performing LDPC encoding and decoding by a multi-core based general-purpose processor includes: generating a recognizable task from a plurality of code blocks (CBs) by the general-purpose processor; splitting the task into two or more split tasks; assigning the split tasks into the respective cores; generating LDPC encoded split tasks by performing LDPC encoding and/or LDPC decoding on each code block within the split task of the core; and concatenating the LDPC encoded split tasks.

10 Claims, 9 Drawing Sheets

DEVICE AND METHOD FOR PERFORMING LDPC ENCODING AND DECODING FOR GENERAL PURPOSE PROCESSOR

CROSS-REFERENCE TO RELATED APPLICATIONS

The present application claims priority to Patent Application No. 10-2022-0185988, filed on in Korea Intellectual Property Office on Dec. 27, 2022, and Patent Application No. 10-2023-0067412, filed on in Korea Intellectual Property Office on May 25, 2023, the entire contents of which are incorporated herein by reference.

BACKGROUND

1. Technical Field

The present disclosure relates to a device and a method for performing LDPC encoding and decoding for a general-purpose processor.

2. Description of Related Art

The following descriptions serve solely to provide the background information related to the present embodiment and do not constitute the prior art.

To accommodate the rapidly increasing volume of wireless data, a communication system that employs a higher frequency band than the frequency band of the Long Term Evolution (LTE), for example, the 5G New Radio (NR) communication system, is being developed. The 5G NR communication system may support frequency bands both below and above 6 GHz. Also, the 5G NR communication system may provide broadband (for example, bands up to 100 GHz) communication services. The 5G NR communication system may support a variety of communication services and scenarios compared to the LTE communication system. For example, usage scenarios of the 5G NR communication system include enhanced Mobile Broad Band (eMBB), Ultra Reliable Low Latency Communication (URLLC), and massive Machine Type Communication (mMTC).

The transmitting and receiving ends of communication systems, including the 5G NR, may use error correction codes for reliable data transmission. A typical error correction code is a low density parity check (LDPC) code. The LDPC code is a type of linear block code, exhibiting high performance gains during encoding and decoding; known for its low complexity and ability to facilitate parallel operations, the LDPC code is widely adopted in many communication systems for encoding and decoding. In the prior art, for LDPC encoding and decoding, hardware chips such as Field Programmable Gate Array (FPGA) or Application Specific IC (ASIC) were used to implement both the encoder and decoder.

Meanwhile, general-purpose processors, including the Central Processing Unit (CPU), Micro Processing Unit (MPU), and Application Processor (AP), are continually improving performance through the adoption of high integration and multi-core architecture. In addition, as the demand for flexible installation and functional improvement of mobile communication network equipment rises, a need for software-based modem development is also growing. Software-based modems require high-speed data processing technology. In particular, high-speed processing of LDPC encoding and decoding is recognized as very important in the development of software-based modems.

PRIOR ART REFERENCES

Patents

1. Korea laid-open patent No. 10-2022-0033981 (Method and apparatus for decoding Low-Density Parity-Check code)
2. U.S. Pat. No. 8,654,880 (Data transmission using low density parity check coding and constellation mapping)

SUMMARY

One object of the present disclosure is to provide a device and a method for performing LDCP encoding and decoding that may implement high-speed data processing of a multi-core based general-purpose processor by providing concurrency to the LDPC encoding and decoding processes.

One object of the present disclosure is to provide a device and a method for performing LDCP encoding and decoding that may implement multi-task and multi-thread based high-speed data processing of a general-purpose processor by configuring a set of code blocks in the form of tasks and decomposing the tasks into a plurality of sub-tasks and assigning the sub-tasks to individual cores.

Technical objects to be achieved by the present disclosure are not limited to those described above, and other technical objects not mentioned above may also be clearly understood from the descriptions given below by those skilled in the art to which the present disclosure belongs.

According to an embodiment of the present disclosure, a method for Low Density Parity Check (LDPC) encoding and decoding for a general-purpose processor in methods for performing LDPC encoding and decoding by a multi-core based general-purpose processor, the method comprising: generating a recognizable task from a plurality of code blocks (CBs) by the general-purpose processor; splitting the task into two or more split tasks; assigning the split tasks into the respective cores; generating LDPC encoded split tasks by performing LDPC encoding and/or LDPC decoding on each code block within the split task of the core; and concatenating the LDPC encoded split tasks.

According to an embodiment of the present disclosure, a device for Low Density Parity Check (LDPC) encoding and decoding for a general-purpose processor, performing LDPC encoding and decoding for a multi-core based general-purpose processor, the device comprising: a generation unit generating a recognizable task from a plurality of code blocks (CBs) by the general-purpose processor; a split unit splitting the task into two or more split tasks; an allocation unit assigning the split tasks to the respective cores; and a concatenation unit concatenating LDPC encoded split tasks generated by performing LDPC encoding and/or LDPC decoding on each code block within the split task of the core.

According to an embodiment of the present disclosure, high-speed data processing of a multi-core based general-purpose processor may be implemented by providing concurrency to the LDPC encoding and decoding processes.

According to an embodiment of the present disclosure, multi-task and multi-thread based high-speed data processing of a general-purpose processor may be implemented by configuring a set of code blocks in the form of tasks and decomposing the tasks into a plurality of sub-tasks and assigning the sub-tasks to individual cores.

The technical effects of the present disclosure are not limited to the technical effects described above, and other technical effects not mentioned herein may be understood to those skilled in the art to which the present disclosure belongs from the description below.

DETAILED DESCRIPTION

Figure 1:
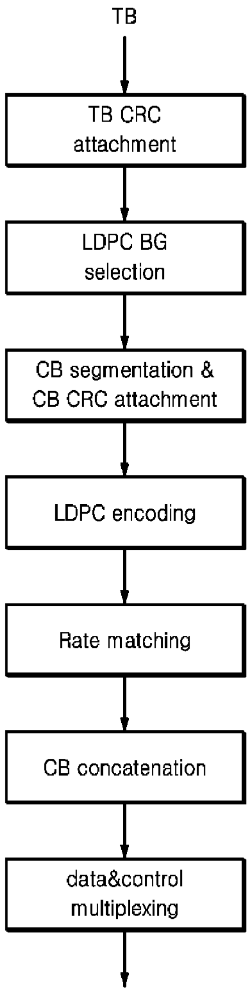
FIG. 1 is a block diagram illustrating a process of encoding a transmitter data channel of the 5G NR.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

The following detailed description is intended to describe exemplary embodiments of the present invention and is not intended to represent the only embodiments in which the present invention may be practiced.

FIG. 1 is a block diagram illustrating a process of encoding a transmitter data channel of the 5G NR.

After a transport block (TB) is input to the transmitter, a modem attaches a Cyclic Redundancy Check (CRC) to the transport block (TB). The transport block (TB) to which the CRC is attached selects a base graph (BG) of Low Density Parity Check (LDPC). The base graph (BG) consists of two types, and the selection of the base graph (BG) is determined based on the size of the transport block (TB). The transport block (TB) for which the base graph is determined is segmented to form a set of a plurality of code blocks (CBs). A Cyclic Redundancy Check (CRC) is added to each of the plurality of code blocks (CBs) and input into the LDPC encoding process. When LDPC encoding is completed, rate matching and code block (CB) concatenation processes are performed to adjust the bit rate to a set length. The modem transmits the connected code block (CB) to the receiving end. Through the process above, the coding process and data transmission of the downlink data channel (DL-SCH) and uplink data channel (UL-SCH) of the 5G New Radio (NR) are completed. The data reception process and decoding of the downlink data channel and uplink data channel of the 5G NR are performed in the reverse order of the encoding process and data transmission process.

Figure 2:
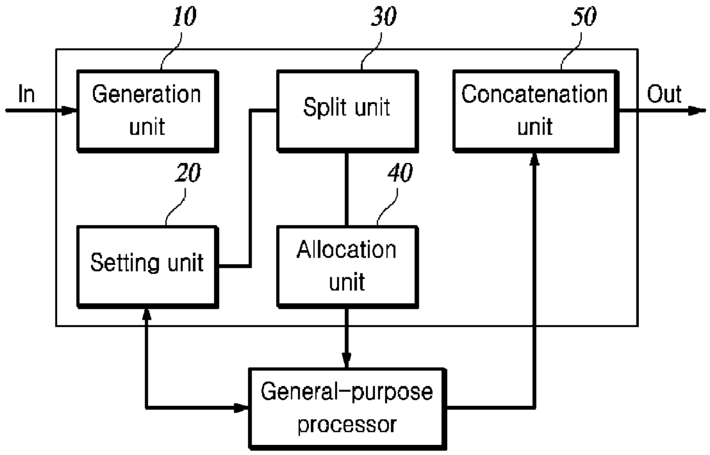
FIG. 2 is a block diagram of a device for LDPC encoding and decoding according to the present disclosure.
Figure 3:
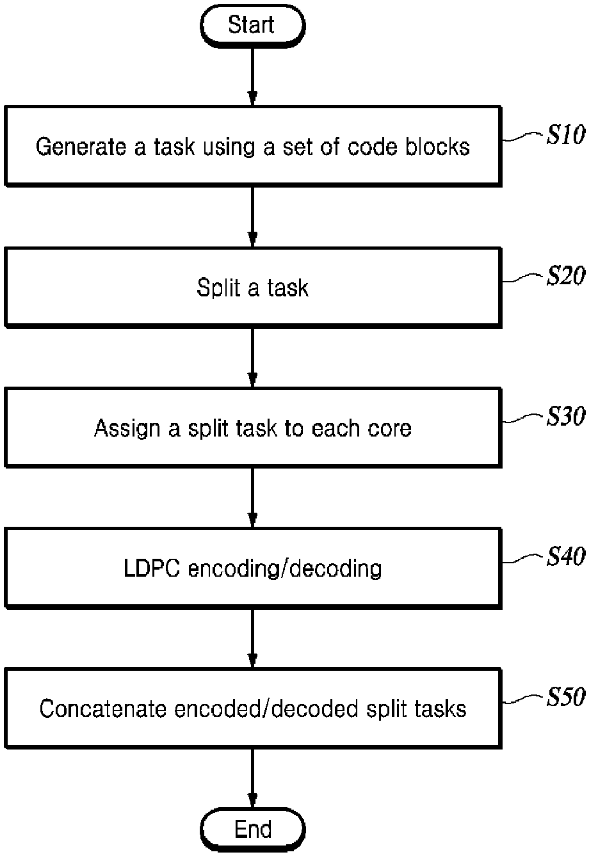
FIG. 3 is a flow diagram of a method for LDPC encoding and decoding according to the present disclosure.
Figure 4:
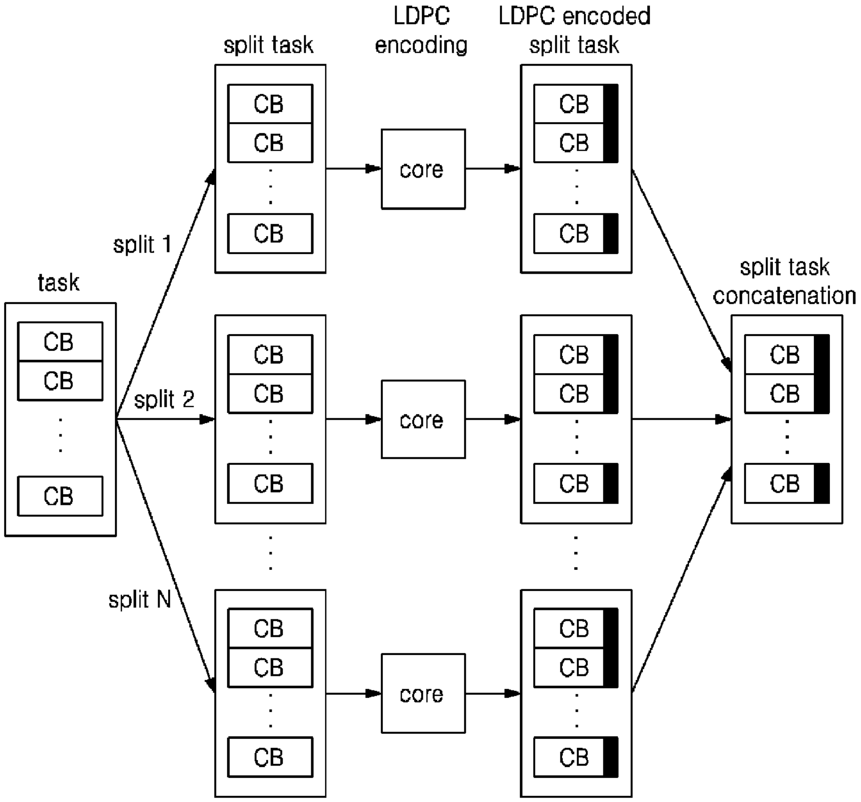
FIG. 4 is a conceptual drawing of a method for LDPC encoding according to one embodiment of the present disclosure.

FIG. 2 is a block diagram of a device for LDPC encoding and decoding according to the present disclosure, FIG. 3 is a flow diagram of a method for LDPC encoding and decoding according to the present disclosure, and FIG. 4 is a conceptual drawing of a method for LDPC encoding according to one embodiment of the present disclosure.

To increase the processing speed of the LDPC encoding and decoding, the device and the method for LDPC encoding and decoding according to the present disclosure implement core allocation and signal processing by applying multi-thread and multi-task techniques supported by a multi-core based general-purpose processor. One embodiment of the present disclosure describes a structure for multi-core/multi-task based signal processing.

The device for LDPC encoding and decoding for a general-purpose processor according to the present disclosure includes a generation unit 10, a setting unit 20, a split unit 30, an allocation unit 40, and a concatenation unit 50. FIG. 2 illustrates a block diagram in which the device for LDPC encoding and decoding is separated from the general-purpose processor; however, the present disclosure is not limited to the specific description, and a structure and algorithms for performing each function of the device for LDPC encoding and decoding may be implemented in an embedded or pre-stored form inside the general-purpose processor.

The generation unit 10 generates a plurality of code blocks (CBs) that are LDPC encoding and decoding targets in the form of a task so that a general-purpose processor may recognize the CBs S10. A task is a unit of signal processing, which may be recognized by the general-purpose processor. The setting unit 20 additionally performs a process of setting the number of cores to perform LDPC encoding or decoding (perform the task) among multiple cores.

The number of cores may be preset according to the specifications of the general-purpose processor. The setting unit 20 isolates one or more specific cores among multiple cores. The setting unit 20 sets the number of isolated cores to the number of cores to perform LDPC encoding or decoding. Here, isolation means designating the cores to be used independently among a plurality of cores included in the general-purpose processor without interference from the operating system (OS) kernel.

Alternatively, the setting unit 20 may perform a process of setting the number of isolated cores to the number of cores below a predetermined utilization rate among multiple cores included in the general-purpose processor. In this case, the core utilization rate may be determined by requesting a status check command of the general-purpose processor provided by the kernel of the operating system. By checking the status of the general-purpose processor, the number of cores below the predetermined utilization rate may be identified, and the identified cores are allocated to perform the task.

The split unit 30 splits the task created by the generation unit 10 into two or more split tasks S20. A split task includes code blocks (CBs) of a portion of the transport blocks (TBs).

The code blocks (CBs) included in all split tasks are the same as the code blocks (CBs) included in the transport block (TB).

The maximum number of split tasks is predetermined according to the data processing capacity of the general-purpose processor. When determining the number of split tasks, the split unit 30 sets the minimum value among 1) the maximum number of split tasks, 2) the number of code blocks, and 3) the number of cores to the number of split tasks. For example, if the maximum number of split tasks is 16, the number of code blocks is 128, and the number of cores is 8, the number of split tasks is set to 8.

Through the process described above, the setting unit 20 sets the number of cores to be used for LDPC encoding or decoding, and the split unit 30 completes the setting of the number of split tasks. Each split task includes a plurality of code blocks (CBs). The split task is assigned to a predetermined core and encoding or decoding is performed on the code block (CB) included in the split task.

The number of code blocks (CBs) included in the split task corresponds to the total number of code blocks divided evenly by the number of predetermined cores (cores to be used for LDPC encoding or decoding). For example, if the total number of code blocks (CBs) is 128, and the number of predetermined cores is 8, the number of code blocks (CBs) included in a single split task is 16. In other words, 8 split tasks are divided to include 16 code blocks (CBs) and assigned to the respective eight cores to process LDPC encoding or decoding.

Alternatively, the number of code blocks (CBs) included in a split task may be designed to have a different value depending on the utilization rate of the core allocated to the split task. For example, suppose the total number of code blocks (CB) is 64, and 4 cores with utilization rates of 0%, 10%, 20%, and 30% respectively perform LDPC encoding or decoding; it may be designed so that split task 1 assigned to the core with utilization rate of 0% includes 20 CBs, split tasks 2 assigned to the core with utilization rate of 10% includes 18 CBs, split task 3 assigned to the core with utilization rate of 20% includes 14 CBs, and split task 4 assigned to the core with utilization rate of 30% includes 12 CBs. In other words, the core utilization rate and the number of code blocks (CBs) included in a split task are inversely proportional to each other. By using the inverse proportionality, optimal efficiency may be achieved when signal processing for LDPC encoding or decoding is performed. The inversely proportional relationship between the core utilization rate and the number of code blocks (CBs) may be modeled as a linear inverse relationship based on a first-order function but is not limited to the specific model. For example, it may be modeled as a non-linear, inversely proportional relationship based on a multi-order function using various parameters, such as processing speed according to core utilization rate, LDPC processing time for a single code block (CB), and specifications of a general-purpose processor.

The allocation unit 40 assigns a split task including code blocks (CBs) to a corresponding core S30. Each core included in the general-purpose processor performs LDPC encoding or decoding on each code block (CB) within the assigned split task to generate LDPC encoded/decoded split tasks S40. As shown in FIG. 4, each LDPC encoded split task includes individual code blocks (CBs) for which the LDPC encoding process has been completed. The concatenation unit 50 completes the LDPC encoding or decoding process by performing a process of concatenating the LDPC encoded split tasks. Afterward, as in the signal processing process of the 5G NR described above, signal processing is performed through a rate matching process (by the transmitter in the case of LDPC encoding) or a code block (CB) concatenation process (by the receiver in the case of LDPC decoding).

Figure 5:
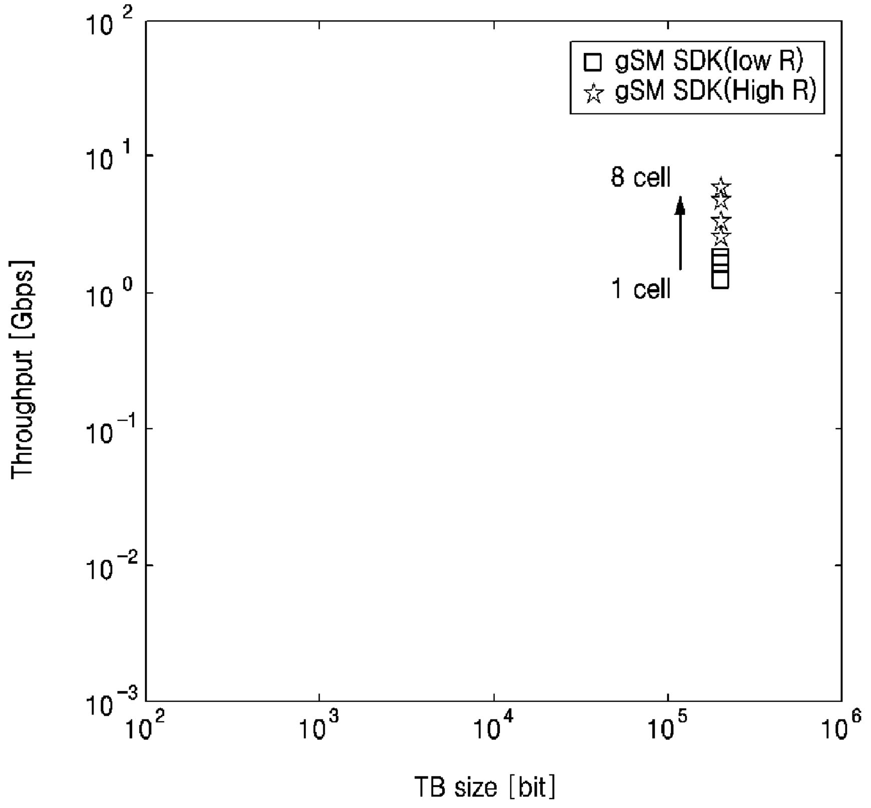
FIG. 5 is a graph illustrating an increase of processing speed in a downlink data channel (DL-SCH) due to a method for LDPC encoding according to one embodiment of the present disclosure.
Figure 6:
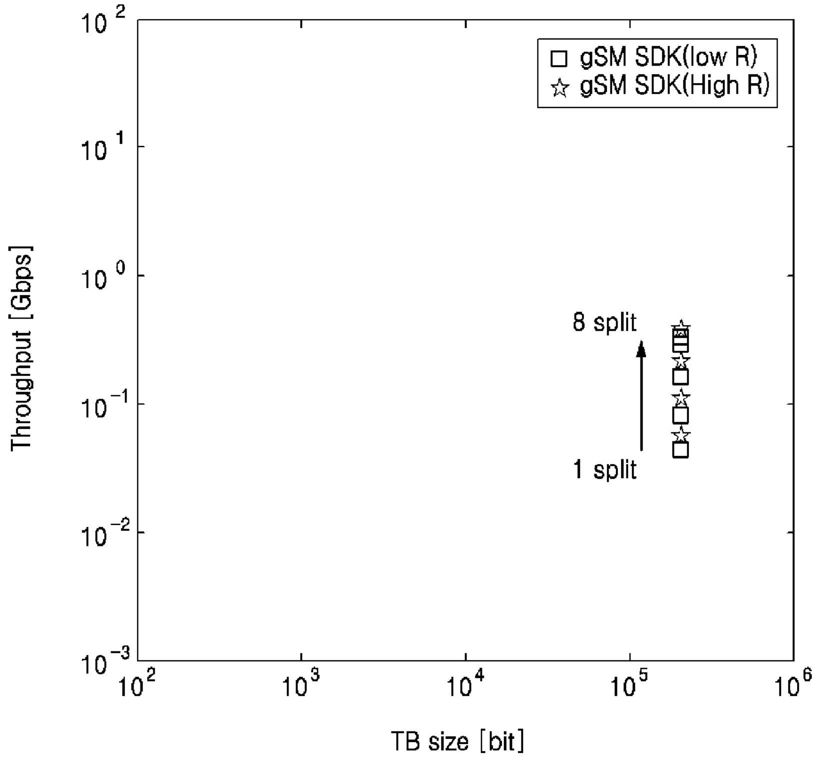
FIG. 6 is a graph illustrating an increase of processing speed in an uplink data channel (UL-SCH) due to a method for LDPC decoding according to one embodiment of the present disclosure.

FIG. 5 is a graph illustrating an increase of processing speed in a downlink data channel (DL-SCH) due to a method for LDPC encoding according to one embodiment of the present disclosure, and FIG. 6 is a graph illustrating an increase of processing speed in an uplink data channel (UL-SCH) due to a method for LDPC decoding according to one embodiment of the present disclosure.

In the case of FIG. 5 (in the case of data encoding by the DL-SCH transmitter), the multi-core/split-task method according to the present disclosure exhibits a significant increase of data processing speed compared to the conventional method (single core/single task method) for all cases where 2/4/8 multi-cores are employed. In the case of FIG. 6 (in the case of data decoding by the UL-SCH receiver), the multi-core/split task method according to the present disclosure exhibits a significant increase of data processing speed compared to the conventional method (single core/single task method) for all cases where 2/4/8 multi-cores are employed. Here, data processing includes LDPC encoding or decoding.

Figure 7:
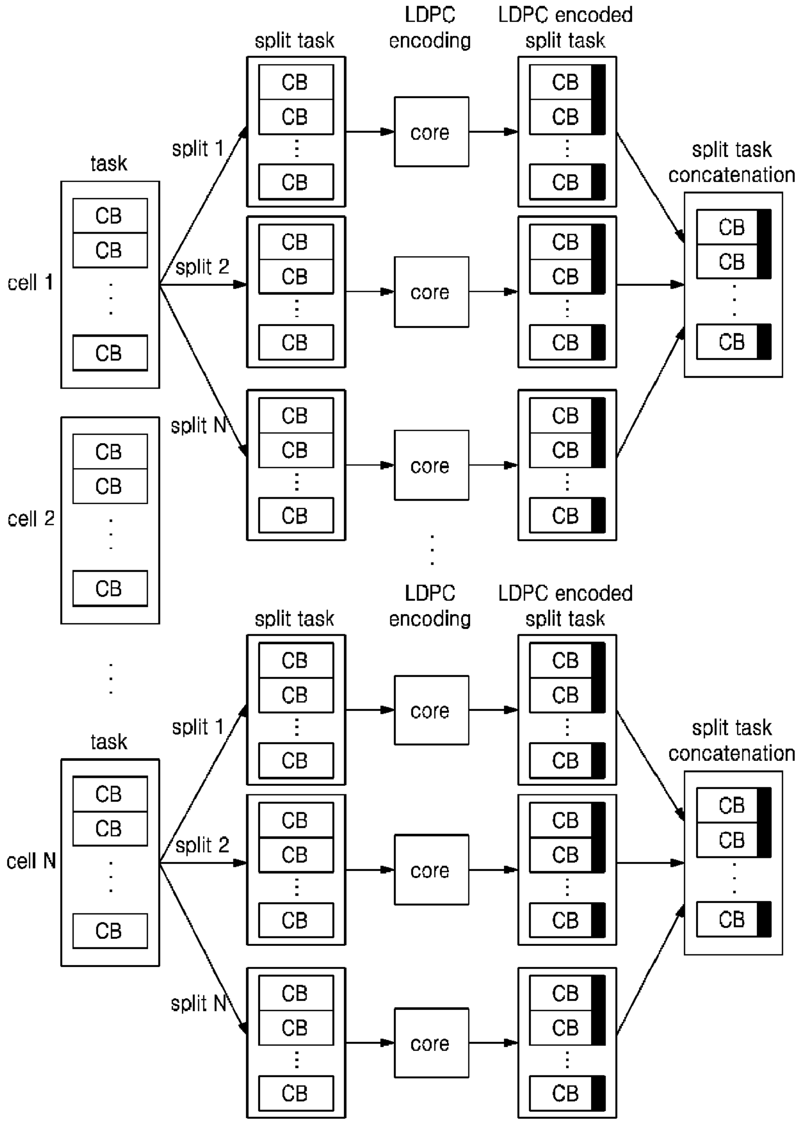
FIG. 7 is a conceptual drawing of a method for LDPC encoding according to another embodiment of the present disclosure.

FIG. 7 is a conceptual drawing of a method for LDPC encoding according to another embodiment of the present disclosure.

To increase the processing speed of the LDPC encoding and decoding process, the present disclosure implements core allocation and signal processing by applying multi-thread and multi-task techniques supported by a multi-core based general-purpose processor.

Another embodiment of the present disclosure shows a structure for multi-core/multi-thread based signal processing.

When signal processing is required for a plurality of cells of a mobile communication base station in the 5G NR, signal processing is performed in units of CBs included in each cell for encoding or decoding to be processed in the corresponding cell. Afterward, each code block (CB) is split into a plurality of split tasks. The LDPC encoding and decoding device performs LDPC encoding or decoding by assigning each split task to a predetermined core included in the general-purpose processor.

Figure 8:
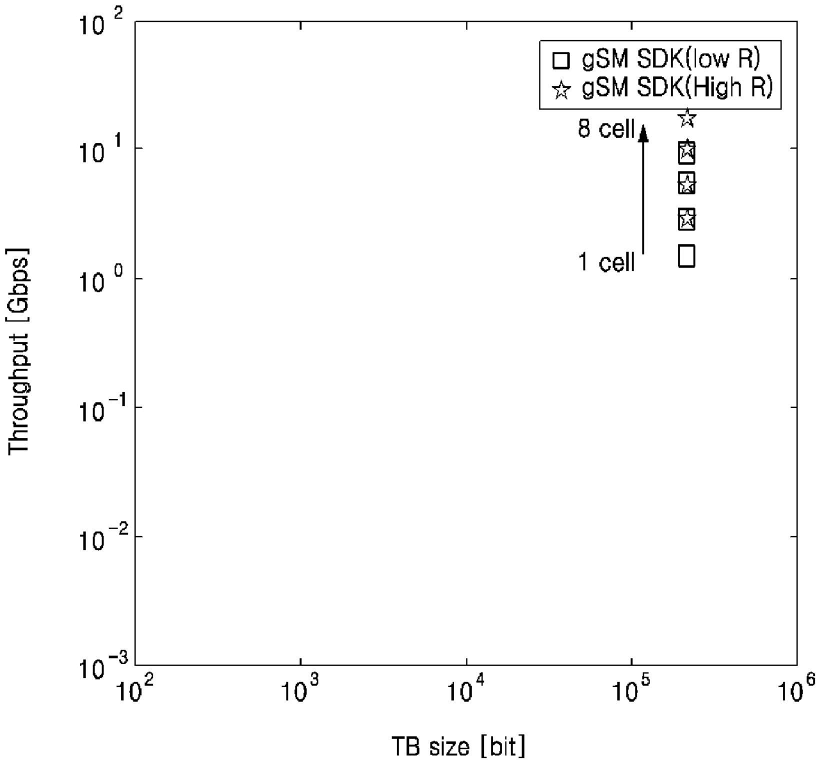
FIG. 8 is a graph illustrating an increase of processing speed in a downlink data channel (DL-SCH) due to a method for LDPC encoding according to another embodiment of the present disclosure.
Figure 9:
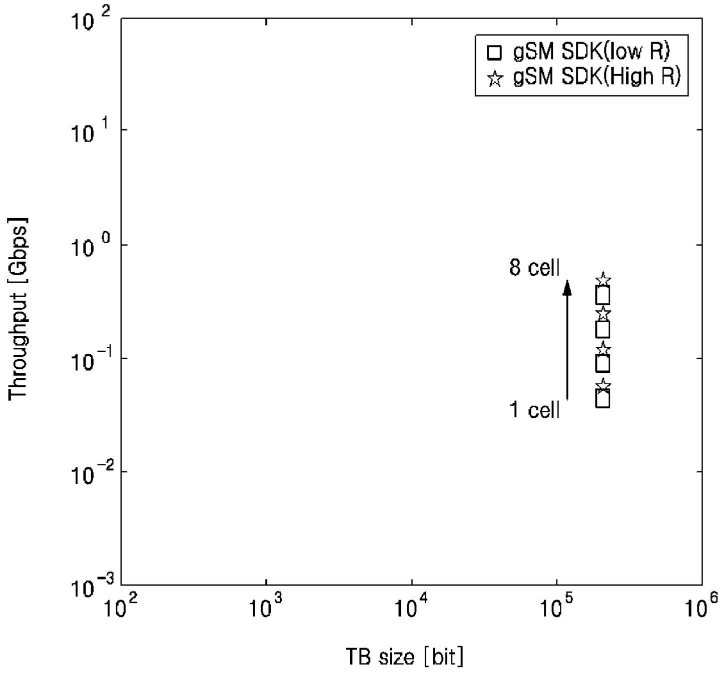
FIG. 9 is a graph illustrating an increase of processing speed in an uplink data channel (UL-SCH) due to a method for LDPC decoding according to another embodiment of the present disclosure.

FIG. 8 is a graph illustrating an increase of processing speed in a downlink data channel (DL-SCH) due to a method for LDPC encoding according to another embodiment of the present disclosure, and FIG. 9 is a graph illustrating an increase of processing speed in an uplink data channel (UL-SCH) due to a method for LDPC decoding according to another embodiment of the present disclosure.

In the case of FIG. 8 (in the case of data encoding by the DL-SCH transmitter), the multi-core/split-task method according to the present disclosure exhibits a significant increase of data processing speed compared to the conventional method (single core/single task method) for all cases where 2/4/8 multi-cores are employed. In the case of FIG. 9 (in the case of data decoding by the UL-SCH receiver), the multi-core/split task method according to the present disclosure exhibits a significant increase of data processing speed compared to the conventional method (single core/single task method) for all cases where 2/4/8 multi-cores are employed. Here, data processing includes LDPC encoding or decoding.

The present disclosure may implement high-speed data processing of a multi-core based general-purpose processor by providing concurrency to the LDPC encoding and decoding processes. Moreover, the present disclosure may implement multi-task and multi-thread based high-speed data processing of a general-purpose processor by configuring a set of code blocks in the form of tasks and decomposing the tasks into a plurality of sub-tasks and assigning the sub-tasks to individual cores.

At least part of the constituting elements described in the exemplary embodiments of the present disclosure may be implemented using a hardware element including at least one of a digital signal processor (DSP), a processor, a controller, an application-specific IC (ASIC), a programmable logic device (e.g., FPGA), and other electronic components or a combination thereof. Also, at least some of the functions or processes described in the exemplary embodiments may be implemented using software, and the software may be stored in a recording medium. At least part of the constituting elements, functions, and processes described in the exemplary embodiments of the present disclosure may be implemented through a combination of hardware and software.

A method according to exemplary embodiments of the present disclosure may be implemented using a program that may be executed in a computer and may be implemented using various types of recording media, including a magnetic storage device, an optical recording medium, and a digital storage device.

Various techniques described in the present disclosure may be implemented using digital electronic circuitry, computer hardware, firmware, software, or combinations thereof. The implementations may be realized as a computer program tangibly embodied in a computer program product, i.e., an information carrier, e.g., a machine-readable storage device (computer-readable recording medium) or a radio signal for processing by or controlling the operation of a data processing device, e.g., a programmable processor, a computer, or a plurality of computers. Computer programs, such as the computer program(s) described above, may be written in any form of programming language, including compiled or interpreted languages, and may be written in any form including a stand-alone program or another unit suitable to be used in a module, a component, a subroutine, or a computing environment. The computer programs may be deployed for processing on one computer or multiple computers at one site or distributed across multiple sites and interconnected by a communications network.

Processors suitable for processing computer programs include, for example, both general-purpose and special-purpose microprocessors and any one or more processors of any type of digital computer. Typically, a processor will receive instructions and data from a read-only memory, a random access memory, or both. Elements of a computer may include at least one processor that executes instructions and one or more memory devices storing instructions and data. Generally, a computer may include one or more mass storage devices storing data, such as magnetic disks, magneto-optical disks, or optical disks, receive data from the mass storage devices, transmit data to the mass storage devices, or transmit and receive to and from the mass storage devices. Information carriers suitable for embodying computer program instructions and data include, for example, semiconductor memory devices; magnetic media such as hard disks, floppy disks, and magnetic tapes; optical media such as Compact Disk Read Only Memory (CD-ROM), Digital Video Disk (DVD); magneto-optical media such as floptical disk; Read Only Memory (ROM); Random Access Memory (RAM); flash memory; Erasable Programmable ROM (EPROM); and Electrically Erasable Programmable ROM (EEPROM). The processor and the memory may be supplemented by or included in special purpose logic circuitry.

The processor may execute an operating system and software applications executed on the operating system. Also, the processor device may access, store, manipulate, process, and generate data in response to the execution of software. For the convenience of understanding, the processor device may be described as being used as a single processor device, but it should be understood by those skilled in the art that the processor device includes multiple processing elements and/or multiple types of processing elements. For example, a processor device may include multiple processors or one processor and one controller. Also, other processing configurations, such as parallel processors, are possible.

Also, non-transitory computer-readable media may be an arbitrary available medium that may be accessed by a computer, which may include both a computer storage medium and a transmission medium.

What is claimed is:

1. A method for performing Low Density Parity Check (LDPC) encoding and/or decoding by a multi-core based general-purpose processor, the method comprising:

generating, by the general-purpose processor, a recognizable task from a plurality of code blocks (CBs);

monitoring a utilization rate of each of a plurality of cores of the general-purpose processor, and selecting, as LDPC processing cores, cores having a utilization rate equal to or less than a predetermined threshold from among the plurality of cores;

setting a number of cores to perform LDPC encoding and/or LDPC decoding among the plurality of cores to be the number of the selected LDPC processing cores;

splitting the task into two or more split tasks, wherein a number of the split tasks is set to a minimum value among (i) a maximum value of the number of split tasks that is predetermined according to a data processing capacity of the general-purpose processor, (ii) the number of the code blocks, and (iii) the number of the cores set to perform LDPC encoding and/or LDPC decoding;

assigning the split tasks to the respective LDPC processing cores;

generating LDPC encoded split tasks by performing, in parallel by the respective LDPC processing cores, LDPC encoding and/or LDPC decoding on each code block within the assigned split task; and concatenating the LDPC encoded split tasks in accordance with an original order of the code blocks.

2. The method of claim 1, wherein the selecting comprises isolating, from among the plurality of cores, the cores having a utilization rate equal to or less than the predetermined threshold, as the LDPC processing cores.

3. The method of claim 2, wherein the number of code blocks included in the split task corresponds to the total number of code blocks divided evenly by the number of cores.

4. The method of claim 1, wherein the number of code blocks included in the split task has a different value depending on the utilization rate of the core allocated to the split task.

5. The method of claim 4, wherein the utilization rate of the core and the number of code blocks included in the split task have an inversely proportional relationship.

6. An apparatus for performing Low Density Parity Check (LDPC) encoding and/or decoding by a multi-core based general-purpose processor, the device apparatus comprising:

a generation unit configured to generate a recognizable task from a plurality of code blocks (CBs);

a setting unit configured to monitor a utilization rate of each of a plurality of cores of the general-purpose processor, to select, as LDPC processing cores, cores having a utilization rate equal to or less than a predetermined threshold from among the plurality of cores, and to set a number of cores to perform LDPC encoding and/or LDPC decoding among the plurality of cores to be the number of the selected LDPC processing cores;

a split unit configured to split the task into two or more split tasks, wherein a number of the split tasks is set to a minimum value among (i) a maximum value of the number of split tasks that is predetermined according to a data processing capacity of the general-purpose processor, (ii) the number of the code blocks, and (iii) the number of the cores set to perform LDPC encoding and/or LDPC decoding;

an allocation unit configured to assign the split tasks to the respective LDPC processing cores; and a concatenation unit configured to concatenate, in accordance with an original order of the code blocks, the LDPC encoded split tasks generated by the respective LDPC processing cores performing, in parallel, LDPC encoding and/or LDPC decoding on each code block within the assigned split task.

7. The apparatus of claim 6, wherein the setting unit isolates from among the plurality of cores, the cores having a utilization rate equal to or less than the predetermined threshold, as the LDPC processing cores.

8. The apparatus of claim 7, wherein the number of code blocks included in the split task corresponds to the total number of code blocks divided evenly by the number of cores.

9. The apparatus of claim 6, wherein the number of code blocks included in the split task has a different value depending on the utilization rate of the core allocated to the split task.

10. The apparatus of claim 9, wherein the utilization rate of the core and the number of code blocks included in the split task have an inversely proportional relationship.

* * * * *